United States Patent
Duong-Van

(10) Patent No.: US 9,201,863 B2
(45) Date of Patent: *Dec. 1, 2015

(54) SENTIMENT ANALYSIS FROM SOCIAL MEDIA CONTENT

(75) Inventor: Minh Duong-Van, San Diego, CA (US)

(73) Assignee: WOODWIRE, INC., Menlo Park, CA (US)

( * ) Notice: Subject to any disclaimer, the term of this patent is extended or adjusted under 35 U.S.C. 154(b) by 978 days.

This patent is subject to a terminal disclaimer.

(21) Appl. No.: 13/284,604

(22) Filed: Oct. 28, 2011

(65) Prior Publication Data

US 2012/0101808 A1   Apr. 26, 2012

Related U.S. Application Data

(63) Continuation-in-part of application No. 12/977,513, filed on Dec. 23, 2010.

(60) Provisional application No. 61/284,820, filed on Dec. 24, 2009, provisional application No. 61/284,819, filed on Dec. 24, 2009, provisional application No. 61/407,869, filed on Oct. 28, 2010, provisional application No. 61/486,692, filed on May 16, 2011.

(51) Int. Cl.
*G06F 17/27* (2006.01)
*G06Q 30/02* (2012.01)

(52) U.S. Cl.
CPC ............ *G06F 17/2785* (2013.01); *G06Q 30/02* (2013.01)

(58) Field of Classification Search
CPC ...................... G06F 17/2785; G06F 17/30707
USPC .............................................................. 704/9
See application file for complete search history.

(56) References Cited

U.S. PATENT DOCUMENTS

| | | | |
|---|---|---|---|
| 2006/0069589 A1* | 3/2006 | Nigam et al. ...................... 705/1 |
| 2006/0200341 A1* | 9/2006 | Corston-Oliver et al. ........ 704/5 |
| 2006/0287988 A1* | 12/2006 | Mason .............................. 707/3 |
| 2007/0299815 A1* | 12/2007 | Starbuck et al. .................. 707/3 |
| 2008/0195595 A1* | 8/2008 | Masuyama et al. ............... 707/5 |
| 2008/0249764 A1* | 10/2008 | Huang et al. ...................... 704/9 |
| 2008/0270116 A1* | 10/2008 | Godbole et al. .................. 704/9 |
| 2009/0048823 A1* | 2/2009 | Liu et al. ............................ 704/9 |
| 2009/0125371 A1* | 5/2009 | Neylon et al. ................... 705/10 |
| 2009/0193011 A1* | 7/2009 | Blair-Goldensohn et al. .... 707/5 |
| 2009/0319518 A1* | 12/2009 | Koudas et al. .................... 707/5 |
| 2010/0119053 A1* | 5/2010 | Goeldi ..................... 379/265.09 |

(Continued)

OTHER PUBLICATIONS

Cohen, "Recursive Hashing Functions for n-Grams", ACM Transactions on Information Systems, p. 291-320, 1997.*
Ramos, "Using tf-idf to determine word relevance in document queries." Proceedings of the First Instructional Conference on Machine Learning. 2003.*

(Continued)

*Primary Examiner* — Jialong He
(74) *Attorney, Agent, or Firm* — Dentons US LLP

(57) ABSTRACT

Methods and systems for extracting and analyzing user-generated content (UGC) in order to provide opinion-bearing information concerning different categories of a product. Harvested Web pages are examined for keywords to identify categories to which they pertain. Opinion-bearing information regarding those categories is then extracted and analyzed to determine its orientation and, optionally, its strength. The resulting sentiment determinations can be aggregated across multiple product reviews and the like to develop a sentiment summary, which can be reported and used as the basis for advertising, marketing and purchasing decisions, among others.

19 Claims, 5 Drawing Sheets

(56) References Cited

U.S. PATENT DOCUMENTS

2011/0112995 A1* 5/2011 Chang et al. .................... 706/12
2011/0252036 A1* 10/2011 Neylon et al. ................. 707/739
2012/0259616 A1* 10/2012 Peng et al. ........................ 704/9
2012/0271788 A1* 10/2012 Fang et al. ...................... 706/50

OTHER PUBLICATIONS

Melville et al. "Sentiment analysis of blogs by combining lexical knowledge with text classification." Proceedings of the 15th ACM SIGKDD international conference on Knowledge discovery and data mining. ACM, 2009.*

* cited by examiner

SENTIMENT ANALYSIS FROM SOCIAL MEDIA CONTENT

RELATED APPLICATION

This application is a CONTINUATION-IN-PART of and claims priority to U.S. patent application Ser. No. 12/977,513, filed 23 Dec. 2010, which claims priority to U.S. Provisional Patent Application No. 61/284,820, filed 24 Dec. 2009, and U.S. Provisional Patent Application No. 61/284,819, filed 24 Dec. 2009; and also claims priority to U.S. Provisional Patent Application No. 61/407,869, filed 28 Oct. 2010, and U.S. Provisional Patent Application No. 61/486,692, filed 16 May 2011, each of which is incorporated by reference herein in its entirety.

FIELD OF THE INVENTION

The present invention relates to methodologies to extract and categorize opinion information from aggregated content obtained from content sources featuring user-generated content (UGC), such as social media Web sites and the like.

BACKGROUND

The World Wide Web (WWW) or simply, the "Web" is the well-known collection of interlinked hypertext documents hosted at a vast number of computer resources ("hosts") communicatively coupled to one another over networks of computer networks known as the Internet. These documents, which may include text, multimedia files and images, are typically viewed as Web pages with the aid of a Web browser—a software application running on a user's computer system. Collections of related Web pages that can be addressed relative to a common uniform resource locator (URL) are known as Web sites, and are typically hosted on one or more Web servers accessible via the Internet.

In recent years, Web sites featuring UGC, that is content created and posted to Web sites by owners of and, sometimes, visitors to those sites, have become increasingly popular. UGC accounts for a wide variety of content, including news, gossip, audio-video productions, photography and social commentary, to name but a few. Of interest to the present inventors is UGC which expresses opinions (usually, but not necessarily, of the person posting the UGC), for example of products, services or combinations thereof (herein, we will use the term "product" to mean any or all such products and/or services). Social media sites in particular have become popular places for users of those sites to post UGC that includes opinion information.

The opinions and commentary posted to social media sites have become highly influential and many people now make purchasing decisions based on such content. Unfortunately, however, for people seeking out such content in order to inform prospective purchasing decisions and the like, the task is not always easy. Blogs, micro-blogs and social networking sites are replete with ever-changing content and even if one can locate a review or similar post of interest, such reviews typically include much information which is of little or no relevance to the topic and/or the purpose for which the review is being read. Further, while the UGC and opinion information can be of great value to advertisers, retailers and others, it is extremely burdensome to collect and analyze in any systematic way, and even more difficult to extract therefrom meaningful commentary or opinions which can form the basis for appropriate responses or informed decisions.

BRIEF DESCRIPTION OF THE DRAWINGS

The present invention is illustrated by way of example, and not limitation, in the figures of the accompanying drawings in which like reference numerals refer to corresponding parts throughout the drawings and in which.

DETAILED DESCRIPTION

Figure 1:
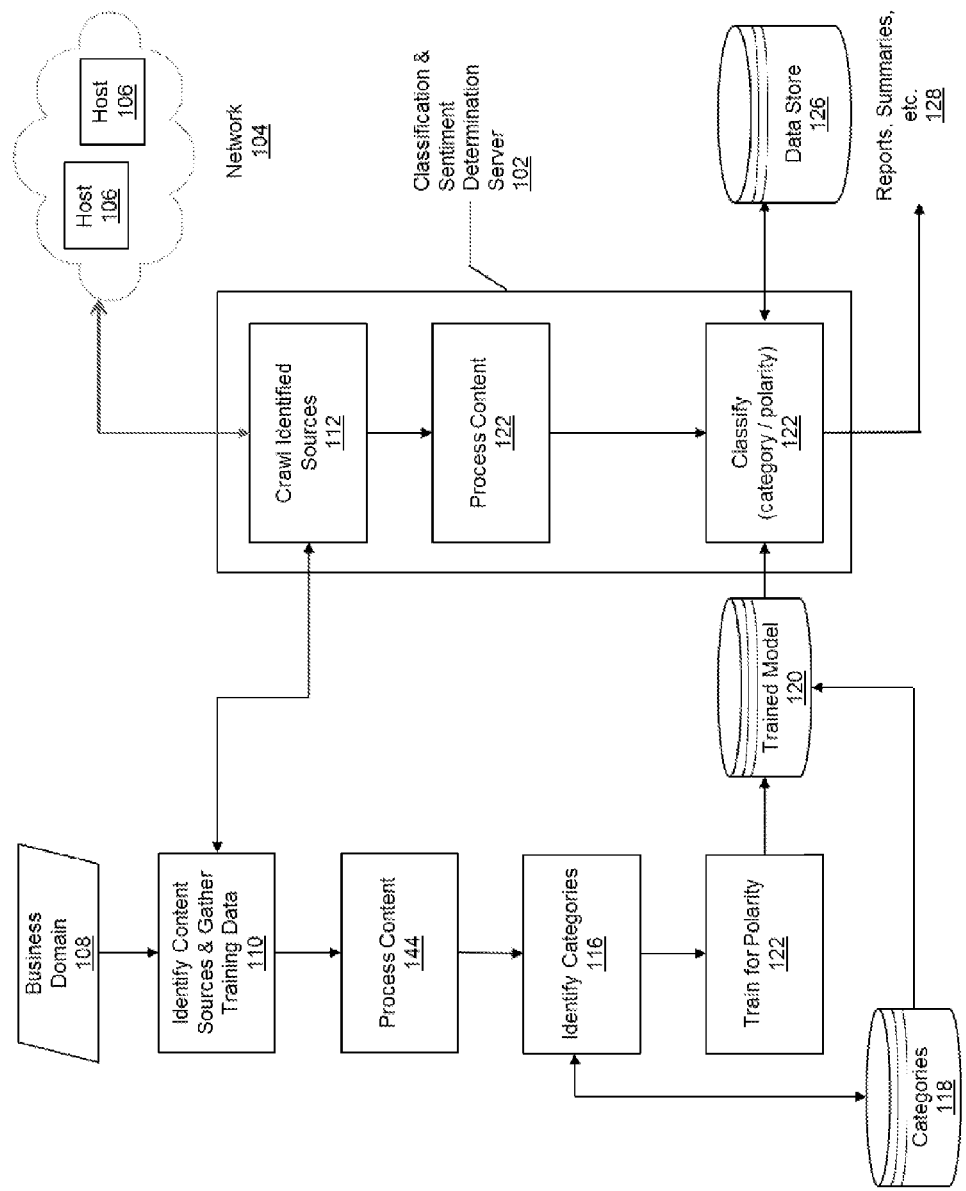
FIG. 1 is a block diagram illustrating functional components of a system for determining sentiment from social media content arranged according to an embodiment of the present invention.

As indicated above, the prevalence of Web-based UGC makes it a desirable target for learning the opinions of users of products. However, analyzing those opinions is extremely difficult given the variety of ways in which UGC is manifest and expressed. Nevertheless, the present inventors have developed useful methods and systems for extracting and analyzing such UGC in order to provide opinion-bearing information concerning different categories of a product. Before describing examples of these systems for extracting and categorizing opinion information from UGC, however, it is useful to present an overview of our methods.

1. Overview.

Given a business domain, i.e., a product, the goal is to determine what users and others are saying (e.g., in the form of UGC and the like) about that product and to do so in an automated fashion that is scalable across the ever-increasing volume of Web-based UGC. More particularly, we wish to quantify (e.g., using a sentiment score or similar measure) peoples' expressed views concerning the product. We call these views "opinions", hence we will use the terms sentiment-bearing and opinion-bearing interchangeably in this description. The sentiment score derived in accordance with the present invention may be used in connection with advertising campaigns, sales promotions and other activities.

In order to eventually automate the sentiment-determination process, we first need to gather training data. Hence, we identify rich data sources at which opinion-bearing UGC can be found. Focused crawlers for these data sources are created and subsequently deployed, allowing the content of the sites along with the associated metadata to be collected. The harvested content is then pre-processed (e.g., by applying stop-word removal) and the remaining most frequent n-grams are identified. These n-grams are treated as keywords, which are used to identify categories. Within each identified category, opinion-bearing keywords are then used to construct a model for use by a sentiment engine (as described in detail below).

This training process is preferably performed separately for each category as the same opinion-bearing keyword (e.g., adjective, adverb, etc.) might (indeed, often does) have different polarities (positive or negative) based on the category. For instance, while the phrase low price would generally be considered to reflect a positive sentiment if the UGC is describing the cost of a product, the phrase low quality would generally be considered to reflect a negative sentiment if the UGC were describing the perceived quality of the product; yet, both phrases employ the word "low" as a modifier. If no category-based differentiation were employed, we would expect the sentiment engine to register an incorrect outcome for one or the other of these phrases when it encounters them in on-line product reviews. Hence, we design our training process to be sensitive as to category differences.

Once the training process is complete, the resulting model is ready to be used to automatically classify harvested UGC content into categories and to extract sentiment therefrom. Typically, the opinion-bearing UGC regarding a product will be obtained from multiple sources. The sentiment engine is then used to create summaries about the product and/or various features thereof, using the model to derive positive and/or negative sentiment. These summaries can be reported and/or used in a variety of different ways, as discussed further below.

2. Example of a System to Extract and Categorize Opinion Information from UGC and the Like.

With the foregoing in mind, we turn now to a more detailed discussion of the present systems and methods for extracting and categorizing opinion information from aggregated UGC. In describing the present invention, we will refer to illustrative systems, methods, techniques, instruction sequences, and computing machine program products. These examples, which are discussed in some detail below, are intended to provide an understanding of the inventive subject matter, but should not be read as limiting the present invention by exclusion of other examples which may not be mentioned. Instead, one should refer to the claims following this description for a proper understanding of the scope of the present invention.

Referring then to FIG. 1, a classification and sentiment determination server 102 is communicatively coupled to a network 104 (e.g., the Internet), which includes hosts 106 at which UGC of interest is located. The hosts may host social media sites (e.g., social networking sites), forums, blogs, product/service provider sites, etc., and the UGC of interest may include opinion-bearing content. The output of the classification and sentiment determination server is stored to a data store 126 (which may be included in or separate from the classification and sentiment determination server). The opinion-bearing content may be included within or with non-opinion-bearing content and non-UGC; hence the need to extract it before it can be analyzed/used.

In the illustration, the functions of classification and sentiment determination are shown as being performed by the same server, however, this need not necessarily be so. In other arrangements, the classification and sentiment determination functions may be performed by different servers and/or may be distributed across multiple servers or other computer-based platforms. The precise hardware arrangement used to perform the methods of the present invention is not necessarily critical to the invention.

As indicated above, in order to extract the UGC from the various content sources, customized Web crawlers are developed. In some instances it may be possible to use general purpose Web crawlers to extract UGC from the content sources, but increasingly it is the case that individual Web sites employ specialized formatting or other features which makes the use of per-site custom Web crawlers appropriate. This way, the Web crawlers can be designed to extract only desired content (e.g., content with may include opinion-bearing information) and not all content at a particular site. This can reduce the burden on the analysis components discussed below.

Of course, before customized Web crawlers can be developed, one must identify sites of interest, that is, sites where opinion-bearing information can be found. Accordingly, for each business domain of interest 108, e.g., a product or service of interest, we first identify data sources of interest and from those data sources gather training data (e.g., portions of UGC posted at the identified sites of interest) 110. The data sources may be any site(s) at which UGC or other opinion-bearing information can be found. Social media sites are often useful for this purpose and so are forums, blogs, product review pages, etc. The training data is used for developing the customized crawlers and ensuring that all of the content of interest at a particular site is being collected (preferably with as little extra content as possible).

Having identified the data sources and determined the manner in which the content is hosted at those sites, the customized crawlers are deployed to gather the content (and, optionally, associated metadata) from the identified sites 112. Content so gathered is processed (e.g., using stop-word removal) 114, the most frequent n-grams are identified, and these n-grams are then used to identify categories 116. The categories so identified are stored in a category database 118.

After the categories have been determined, the sentiment-bearing words associated with those categories are identified and their orientations determined. In one embodiment of the invention, adjectives associated with each category keyword in the extracted content are identified as the opinion-bearing keywords. Keywords can be extracted automatically (e.g., for the entire training dataset or a portion thereof and using a lexicon provided to an extraction engine) and those adjectives can be manually tagged with a polarity (e.g., positive, negative or neutral). Synonyms and antonyms of identified adjectives may be included in the sentiment-bearing words list with their polarity for the selected category.

The identified categories and associated opinion-bearing keywords are then used to construct a trained model 120 for use by the classification and sentiment determination server 102. As indicated above, this model is preferably constructed on a per-category basis so that category-appropriate polarities can be identified 122 and associated with the respective n-gram keywords.

The trained model 120 preferably associates category keywords and their respective opinion-bearing keywords, segregated or otherwise tagged by polarity. Categories may exist at a variety of granularities, for example, hotels, rooms, bathrooms, etc. Within each category, adjectives or other identified opinion-bearing keywords may be segregated as positive, negative or neutral. In some instances, the model will be stored locally by the classification and sentiment determination server 102, but in other cases it will be stored remotely therefrom. In instances where multiple classification and sentiment determination servers are deployed, a single instance of the trained model may be made available to each of the servers, so that the servers all classify and determine sentiment of UGC in the same way, according to a common rule set. In other cases, different classification and sentiment determination servers may be given individual responsibilities for certain sources of UGC and each may have its own, unique model, customized to that data source.

Regardless of such implementation specifics, the model 120 is used by the classification and sentiment determination server 102 to classify 122 content harvested by the Web crawlers by category and sentiment. To do so, the classification and determination server 102 processes 124 the harvested content to extract the category and sentiment keywords and then consults the trained model 120 to determine the polarity of the sentiment-bearing keywords. The output of the classification and sentiment determination server 102 is then stored to data store 126 and may later be used by the sentiment server 102 to create summaries 128 regarding the different products, and/or their features, for which UGC content was harvested. An example of such a summary for the print quality of a particular a printer product (Printer_type_1) is shown in Table 1, below.

TABLE 1

Example of Summary of Sentiments for the Print Quality of Printer Type 1

Printer_type_1
Category: Print Quality
Positive (243)
Individual comments regarding print quality of printer type 1 reflecting positive sentiment
Negative (35)
Individual comments regarding print quality of printer type 1 reflecting negative sentiment In the above example, there were 243 positive comments extracted from the harvested UGC concerning the print quality of the subject printer and 35 negative comments re same. The individual comments so harvested may be grouped under their respective sentiment summaries as shown in the table. The summaries 128 may be provided to advertisers, merchants or others and used to create/revise advertising and marketing campaigns or other for other purposes. Alternatively, or in addition, the summaries may be posted to other Web sites for easy review by users interested in the subject products. In still further embodiments, the summaries may be provided to search engine operators for return to users that execute searches related to the subject products. Of course, such search engines may be owner/operated by the same entity that owns/operates the sentiment server 102 and the sentiment server 102 may respond to queries executed y users of the search engine by providing pre-computed and/or computed-on-the-fly summaries concerning products which are identified in search queries.

3. Customized Web Crawlers.

The crawlers employed in accordance with the present invention are, preferably, customized according to the site(s) from which the crawlers will harvesting content. An individual crawler may be configured to harvest content from a single site or from multiple sites. Some crawlers may be more generalized in nature and used to harvest content from sites for which no customized crawler is deployed. Other crawlers are very particular and will harvest content only from designated portions of a larger site.

Figure 2:
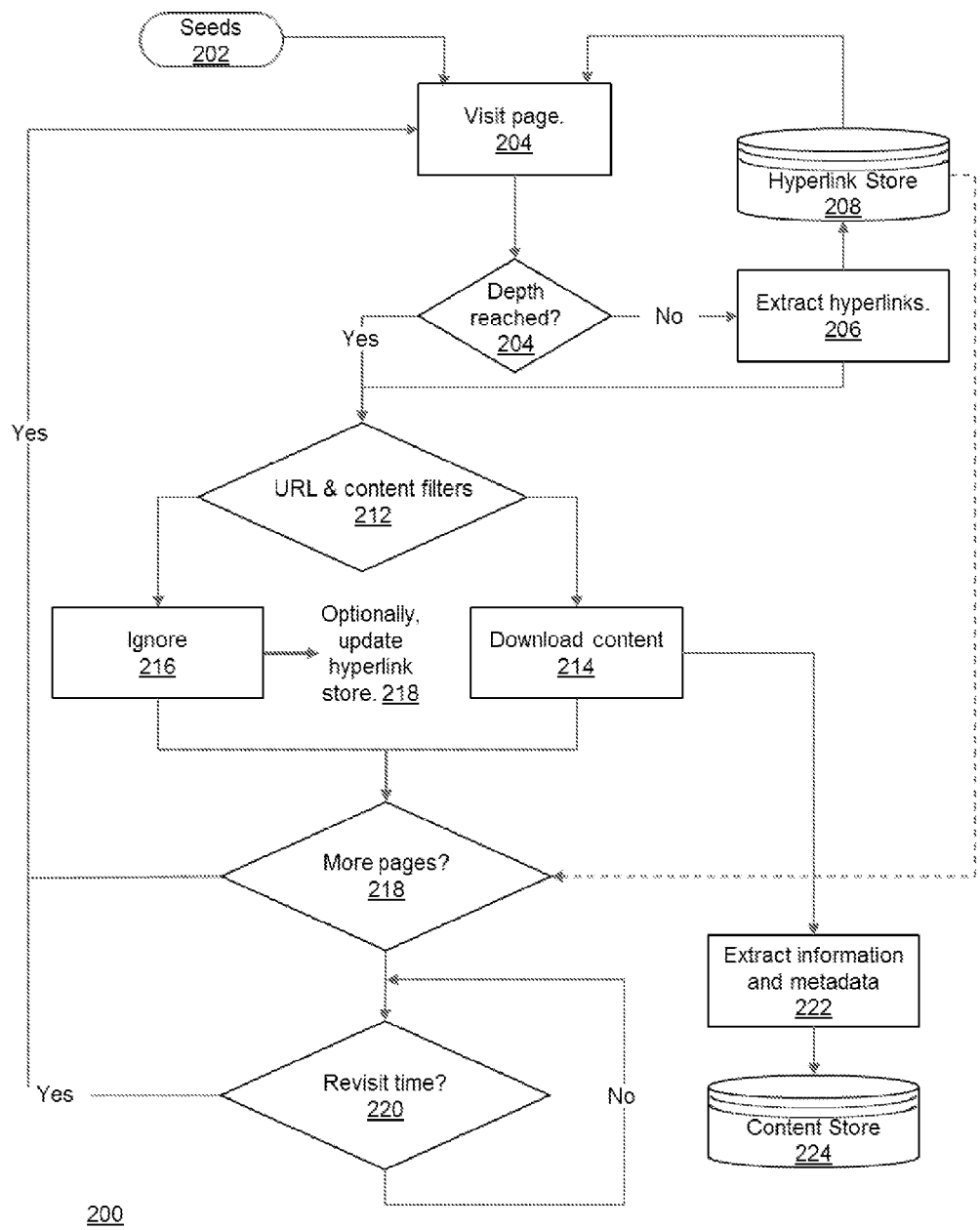
FIG. 2 is a flow diagram illustrating a process for harvesting social media content, configured in accordance with an embodiment of the present invention.

In general, customized crawlers configured in accordance with embodiments of the present invention will parse specific Web sites, and in some cases specific pages from specific Web sites, using a top down approach. Referring to FIG. 2, a process 200 for harvesting content using a customized Web crawler in accordance with embodiments of the present invention is illustrated. Beginning from a specified seed node (e.g., a specified Web page of a specified Web site) 202 the crawler will visit the specified page 204, extract all hyperlinks 206 from the page and archive them in a hyperlink store 208. Subsequently, or in parallel, the crawler will then visit the pages referenced by each of these hyperlinks, download content or not, and repeat the process 218. This continues for a designated depth of pages 210 (e.g., if the specified depth is four, the crawler will extract links from pages that are referenced by pages that are referenced by pages that are referenced by the seed node, inclusive). The depth may be qualified by requirements to remain within the same domain as the seed node, or may be not so restricted. In some cases, references to domains other than that which include the seed node may be subject to review by the crawler to determine whether the referenced page falls within a domain that has been white listed or black listed. In the former instance, the crawler will visit a page only if it is specifically authorized to do so. In the latter case, the crawler will visit a page unless it is specifically prohibited from doing so. In many cases, the crawler will be instructed to harvest content from all pages within a given domain, at least all pages which may include opinion-bearing content. At each Web page visited by the crawler, a decision is made as to whether or not to harvest the page by downloading the content included thereon.

It is a relatively straight forward process to simply download content from every page visited by a crawler. What is not so simple is to build in intelligence that allows the crawler to make a determination as to whether or not such harvesting should occur for a given page. In embodiments of the present invention, the crawlers are provided with such intelligence in the form of URL and content filters 212.

In some instances, we use regular expressions for URL filtering. That is, we specify which URLs to parse and which URLs to ignore. This may be done on a URL-by-URL basis, or on a URL type basis. We also employ content filters that determine whether a particular Web page includes content relevant to the search being conducted by the crawler. If such content exists on a given page, the page's content is harvested 214, otherwise it is not and the page is ignored 216 (if a page is ignored, the hyperlink store may be updated 218 so that the page is not subsequently revisited).

Although not shown in the illustration, the crawlers may also be directed to read any robot.txt files that may be present at a particular site. These files are often included by Web site designers/owners to specify (to automated processes like Web crawlers) portions of a Web site that are off limits to such tools. Thus, the crawlers are well-behaved inasmuch as they are configured to respect site owner directives concerning prohibitions on automated harvesting of content. Alternatively, or in addition, policies may be established so that crawlers only visit sites or request content at intervals which will not unduly burden the resources of the site and/or its host(s). Likewise, for sites that update or change content only relatively infrequently, site revisit policies 220 may be set in accordance with those expected updates so as not to needlessly harvest content that already exists. Of course, some sites change content quite frequently and so revisits may be cast in terms of seconds or minutes, rather then in terms of hours, days or longer.

Content downloaded from pages that are not filtered out is processed to extract information of interest (and, optionally, metadata concerning that information) 222, and the information (and metadata) is stored 224. This information will then be processed for keyword extraction, as discussed with reference to FIG. 3.

4. Keyword Extraction and Category Identification.

The keyword extraction process is used to identify categories and opinion-bearing keywords. In the case of training data, the results are used to build the trained model for the sentiment engine. In other instances, the results are used to classify the opinion-bearing content harvested from a target site. After being so classified, the sentiment engine determines the sentiment expressed in the opinion-bearing content.

Figure 3:
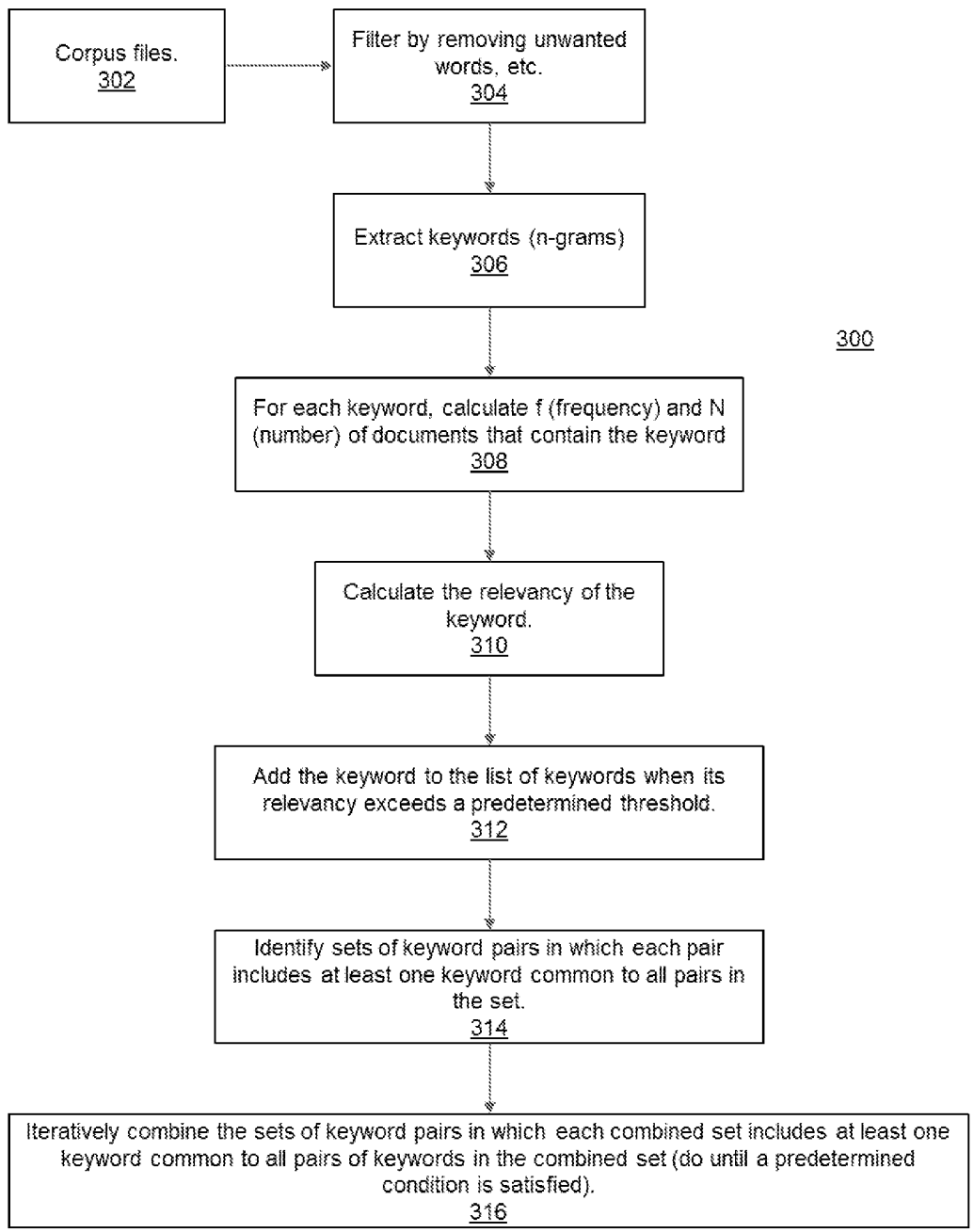
FIG. 3 is a flow diagram showing a method for keyword extraction; according an embodiment of the present invention.

As shown in FIG. 3, the keyword extraction process 300 begins with the corpus of files or other content 302 downloaded by the crawlers and stored in the content store 224. These files are cleaned, for example by stop-word filtering, to remove any words, phrases or other constructs that are known not to be opinion-bearing content 304.

Figure 5:
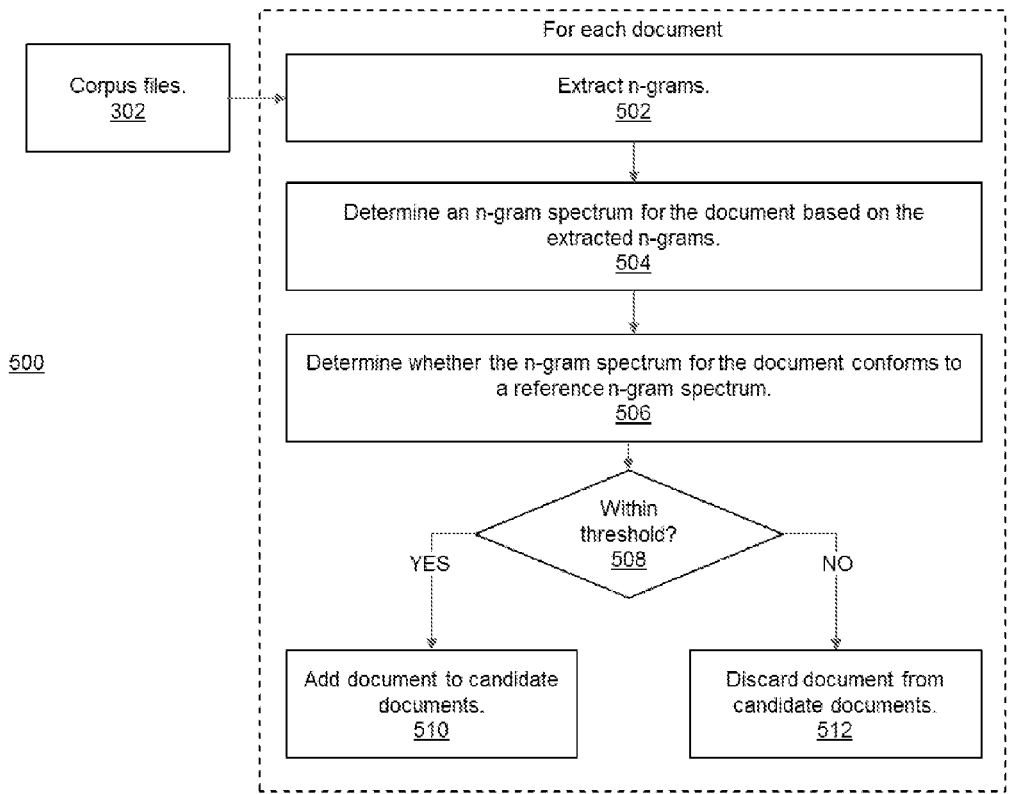
FIG. 5 is a flowchart showing a method for generating a list of categories, according to an embodiment of the present invention.

FIG. 5 illustrates a method 500 for filtering documents from the corpus of files, according to some embodiments of the present invention. For each candidate document in the corpus 302, n-grams are extracted (502), an n-gram spectrum for the document is determined based on the extracted n-grams (504), wherein the n-gram spectrum indicates a frequency of occurrence of n-grams as a function of a size of n-grams, and a determination is made as to whether the n-gram spectrum for the document conforms to a reference n-gram spectrum (506) within a predetermined threshold (508), wherein the reference n-gram spectrum is defined by a predetermined function. In some embodiments, the predetermined function is $cx^{-a} \cdot e^{-bx}$, wherein x is the size of the n-gram, and wherein a, b, and c are predetermined values that place a peak of the predetermined function between an n-gram of size 2 and an n-gram of size 3. In some embodiments, the value of b is between 1 and 2, and the value of c is between 1 and 2. The candidate document is retained (510) when the n-gram spectrum for the document conforms to the reference n-gram spectrum within the predetermined threshold, and discarded (512) when the n-gram spectrum for the document does not conform to the reference n-gram spectrum within the predetermined threshold.

Returning to FIG. 3, keywords are then extracted from the retained documents 306. Keywords may be regarded as those n-grams extracted during the during the filtering process. Next, for each extracted keyword, a frequency, f, of the keyword in the plurality of the documents, and a number of documents, N, that includes the keyword are calculated 308. A phase transition formula is then used to calculate the relevancy of the keyword, based on its frequency in the plurality of documents and the number of documents that include the keyword 310. In one embodiment, the phase transition formula used to determine the relevancy of an individual keyword is $f/N^x$, where $x \geq 1$. The relevancy is compared to a pre-established threshold and the keyword module adds the keyword to the list of keywords when the relevancy of the keyword exceeds that threshold 312. Otherwise, the subject keyword is not added to the list.

Having produced the list of relevant keywords (i.e., those with a relevancy score above the predetermined threshold), the classification module now determines unique pairs of keywords that are related to each other. For example, assume that the corpus of files or other content included m files, from which were extracted n keywords. Each $n^{th}$ keyword from an $m^{th}$ file is matched against (m−1) files, thus forming different clusters. Keywords belonging to each cluster are believed to belong to the same domain. Clusters obtained through this process are later refined and named as categories. The classification module identifies sets of pairs of the keywords in which each set includes at least one keyword that is common to all of the pairs of keywords in the set 314. Next, the classification module iteratively combines the sets of the pairs of keywords in which each combined set includes at least one keyword that is common to all of the pairs of keywords in the combined set until a predetermined termination condition is achieved 316.

Thus, the classification module determines sets of keywords that are related to each other and iteratively combines the sets to form categories. For example, the classification module may identify the following pairs of keywords from the list of keywords:

{Paris, Romance},
{Paris, City of Love},
{Paris, French},
{Dog, Beagle},
{Cat, Siamese}.

The classification module may then determine that {Paris, Romance, City of Love, French} is a set of related keywords (e.g., a category) because the word "Paris" is common to the pairs {Pairs, Romance}, {Paris, City of Love}, {Paris, French}. Note that the classification module may also determine that {Paris, Romance, City of Love} is a set of related keywords. The level of specificity desired for a category determines the predetermined termination condition. The more keywords that are used to describe the category, the more specific the category is (e.g., {Paris, Romance, City of Love, French} is more specific than {Paris, Romance, City of Love}).

The classification module then obtains a plurality of category spectrums 318. A category spectrum may be represented by the pair {WordID, Frequency}, where the value of WordID corresponds to a unique keyword and Frequency corresponds to a frequency of occurrence of the associated keyword. For example, the keyword "Paris" may have a WordID of 8 and a frequency of occurrence of 1002. Thus, the category spectrum includes a pair {8, 1002}. These category spectrums may be visually represented. For example, on a 2-dimensional plot, one axis (e.g., the x-axis) may be WordID and the other (orthogonal) axis (e.g., the y-axis) may be Frequency. In some instances, the category spectrums may be normalized so that the area under each of the category spectrums is the same. Doing so reduces comparative bias between categories. Normalizing may be accomplished by normalizing the frequency of occurrence of the filtered keywords to produce the normalized category spectrum for the category.

5. Sentiment Engine.

The sentiment engine is responsible for determining polarities of individual sentences in a review or other item of UGC. Therefore, in order to employ the sentiment engine, the harvested UGC content is split into sentences, which sentences may be units that are smaller or larger than the grammatical unit typically termed a sentence. That is, the sentences applied to the sentiment engine may be grammatical sentences, portions of one or more grammatical sentences, or multiple grammatical sentences. For convenience, we will use the term sentence to refer to all such constructs which may form inputs for the sentiment engine.

As indicated above, the sentences are first processed to identify categories to which they refer or relate. Those sentences that include category keywords are passed to the sentiment engine. The sentiment engine first determines whether or not the subject sentence contains any opinion-bearing words. We have observed a positive, statistically significant correlation between adjectives and subjectivity of the opinion. Therefore, in one embodiment of the present invention, the presence of an adjective in a sentence is deemed to be a strong indication that the sentence is subjective, i.e., sentiment-bearing. Accordingly, the present sentiment engine deems adjectives as sentiment-bearing keywords and any sentence that classified into a category is analyzed for such sentiment-bearing keywords. We will refer to sentences that are determined to contain at least one category keyword and one or more sentiment-bearing keywords as sentiment sentences.

For each sentiment sentence reviewed by the sentiment engine, all adjectives in the sentence are extracted as sentiment-bearing keywords (the adjectives in the sentence being located using an adjectives lexicon provided to the sentiment engine), and the most adjacent adjective to a subject category keyword is identified as the effective adjective for that category. For example, in the following sentiment sentence: "The beds were nice, the sofas and chairs were comfy, and the kitchenette was stocked with the essentials.", the words nice, comfy and stocked may be identified as sentiment-bearing keywords the word nice is identified as the effective adjective for the category bed. Effective adjectives are used to identify the orientation (polarity) of sentiment sentences by reference to the trained model. In this way, the category keywords and the sentiment-bearing words included in the harvested UGC are used to classify reviews and similar information concerning the subject product.

Various refinements for this overall method may be introduced. For example, in one embodiment of the invention for each sentence in the harvested UGC, category keywords may be identified (as described above) and sentiment-bearing words located. A sentence that is found to contain at least one category keyword and one or more sentiment-bearing words may be referred to as a sentiment candidate. For each category:adjective keyword pair in a given sentiment candidate, the sentiment engine may compute a distance (e.g., in terms of number of words) between them. If the distance is greater than a predefined threshold, then the sentiment candidate is identified as a sentiment sentence for the category the subject keyword belongs to. Otherwise, the sentiment candidate is ignored.

To identify the polarity of the sentiment sentence for the identified category, we need to consider the following situations:

1. A sentiment sentence might contain both likes and dislikes concerning some or all of the categories of the product. In such instances, the opinion words may be either positive or negative. Each opinion word is, however, likely to be closer in distance to the category keyword it is related to than to other category keywords. Therefore, such a sentence can be listed many times for each category with respective probabilities for each sentiment:category pair. For example, in the sentence "The staff was nice, however, the room was very small.", nice and small are opinion words and both are mentioned. Proximities of these opinion words to the identified categories reveals the categories to which each relates; here nice corresponds to a customer service category (as identified by the keyword staff), while small corresponds to a room category (as identified by the keyword room).

2. Sentiment sentences might contain both likes and dislikes about the same category. For instance in the following sentence, "Rooms are small and clean.", the writer is (presumably) not happy with the size of the room, but happy with the room being tidy and neat. Such sentences must also be captured and reported as both negative and positive.

3. For a sentence that contains a contrastive clause (e.g., sentences that start with or include words such as "but", "however", etc.) that indicates a sentiment change for features in the clause, we use the effective opinion in that clause to identify the orientation of the categories. However, if there is no category orientation in the clause, then the polarity of the contrastive clause is identified as the opposite polarity of the remainder of the sentence.

The sentiment engine may also be configured (e.g., via the trained model) to handle manifestations of negation: If there is a negation keyword before a sentiment-bearing keyword and its distance to the sentiment bearing keyword is less than a predetermined threshold, then the polarity of the sentiment sentence may be determined to be the opposite of the polarity of the sentiment-bearing keyword that is associated with the category keyword. For example, in the sentence, "The rooms were not large.", the opinion-bearing keyword large is associated with the category keyword room and, ordinarily, would be deemed to express a positive sentiment. However, because the word not is determined to modify the sentiment-bearing keyword large, the sentiment engine may determine that the opposite sentiment is, in fact, being expressed.

Sentiment candidates or sentiment sentences identified as discussed above might also be determined to contain wishes, thoughts, believes, etc., concerning a product. As such, they may not reflect actual opinions concerning an identified category. Accordingly, in some embodiments of the present invention the sentiment engine applies a filtering technique, wherein keywords such as "guess", "believe", "wish", and other terms expressing desires rather than true opinions, are treated as sentiment eliminators. Any sentiment candidates or sentiment sentences determined to contain such keywords are eliminated from the sentiment sentences list. A dictionary of such eliminators may be provided to the sentiment engine as part of the trained model or in addition thereto.

After identifying the orientation of a sentiment sentence, the sentiment engine identifies how strong the sentiment is. The severity of an opinion can be measured by associating each opinion-bearing keyword with a sentiment score. For example, the sentiment score for the opinion-bearing keyword "bad" may be −1, while the sentiment score for the opinion-bearing keyword "horrible" may be −3 (e.g., on a scale where the sign of the sentiment score is indicative of a positive or negative polarity and the magnitude of the sentiment score indicates the strength or severity thereof). Assigning an overall severity score may require comparison of multiple reviews and an averaging thereof.

Figure 4:
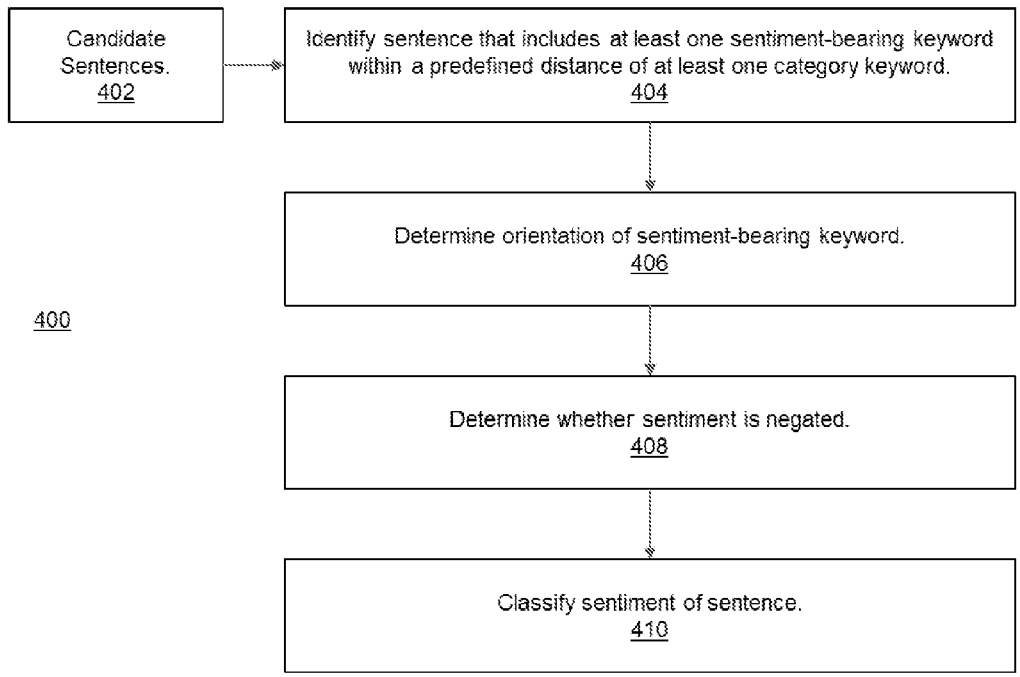
FIG. 4 is a flow diagram showing a method for determining sentiment expressed in a sentence of a document (e.g., a harvested Web page or the like), according to embodiments of the present invention.

FIG. 4 is a flowchart illustrating the highlights of a method 400 for determining sentiment expressed in a sentence of a document (e.g., a harvested Web page or the like), according to embodiments of the present invention. For candidate sentences 402 (which candidates may be grammatical units larger than, equal to or smaller than a grammatical sentence) provided to the sentiment engine, a sentence that includes at least one sentiment-bearing keyword within a predetermined distance of at least one candidate keyword is identified. The sentiment-bearing keyword should be a word (e.g., an adjective) indicating that an expression of sentiment. At 406, the orientation or polarity of the sentiment-bearing keyword is determined (e.g., using the trained model provided to the sentiment engine). The polarity may indicate that the sentiment-bearing keyword reflects a positive sentiment, a negative sentiment, or a neutral sentiment. At 408, the sentiment engine determines whether the assessed polarity is negated (e.g., due to the presence of any sentiment negating words in proximity to the sentiment-bearing keyword). Then, at 410, the sentiment engine classifies the sentiment of the sentence. Not shown, although an optional component of method 400 is an option to discard a candidate sentence if the sentiment engine determines that one or more sentiment eliminators are present in the candidate sentence.

By way of example for the process described with respect to FIG. 4, consider an exemplary document that includes an exemplary sentence: "The room was stinky and the carpets were dirty." Assume that the words "stinky" and "dirty" are sentiment-bearing keywords expressing a negative sentiment (e.g., a negative polarity), and the words "room" and "carpets" are category (or sub-category) keywords. The sentiment engine identifies this candidate sentence as including the sentiment-bearing keywords "stinky" and "dirty" and identifies that these sentiment-bearing keywords are in sufficient proximity to the category keywords "room" and "carpets", respectively, hence, the candidate sentence is passed for further processing. In this example, room and carpet may be sub-categories of a broader category of "hotel room", or may be categories of their own. In either instance, the sentiment identifies "dirty" and "stinky" as sentiment-bearing keywords expressing a negative sentiment. There are no sentiment negating words, hence, the sentence is classified as one that expresses a negative sentiment concerning a hotel room (and/or a room and carpet). This sentence and is classification may be subsequently stored and statistics reflecting the classification updated.

6. Exemplary Computer System

Figure 6:
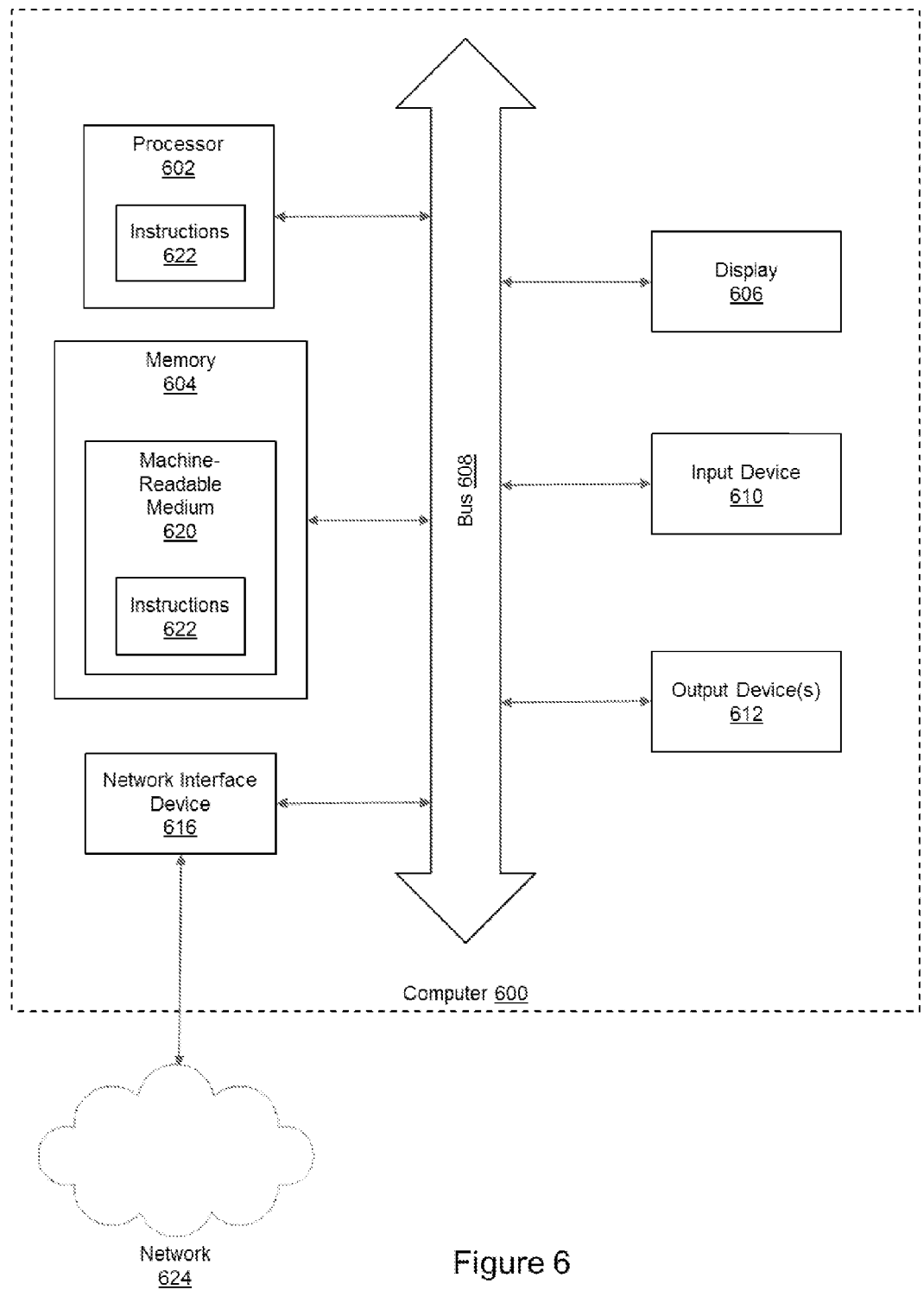
FIG. 6 is a block diagram of a computer system for hosting embodiments of the present invention.

FIG. 6 is a block diagram of a machine in the example form of a computer system 600 within which may be executed a set of instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment or as a peer machine in a peer-to-peer (pr distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the computer system 600 includes a processor 602 (e.g., a central processing unit (CPU), a graphics processing unit (GPU) or both), and memory 604, which communicate with each other via bus 608. Memory 604 includes volatile memory devices (e.g., DRAM, SRAM, DDR RAM, or other volatile solid state memory devices), non-volatile memory devices (e.g., magnetic disk memory devices, optical disk memory devices, flash memory devices, tape drives, or other non-volatile solid state memory devices), or a combination thereof. Memory 604 may optionally include one or more storage devices remotely located from the computer system 600. The computer system 600 may further include video display unit 606 (e.g., a plasma display, a liquid crystal display (LCD) or a cathode ray tube (CRT)). The computer system 600 also includes input devices 610 (e.g., keyboard, mouse, trackball, touchscreen display, etc.), output devices 612 (e.g., speakers), and a network interface device 616. The aforementioned components of the computer system 600 may be located within a single housing or case (e.g., as depicted by the dashed lines in FIG. 6). Alternatively, a subset of the components may be located outside of the housing. For example, the video display unit 606, the input devices 610, and the output device 612 may exist outside of the housing, but be coupled to the bus 608 via external ports or connectors accessible on the outside of the housing.

Memory 604 includes a machine-readable medium 620 on which is stored one or more sets of data structures and instructions 622 (e.g., software) embodying or utilized by any one or more of the methodologies or functions described herein. The one or more sets of data structures may store data. Note that a machine-readable medium refers to a storage medium that is readable by a machine (e.g., a computer-readable storage medium). The data structures and instructions 622 may also reside, completely or at least partially, within memory 604 and/or within the processor 602 during execution thereof by computer system 600, with memory 604 and processor 602 also constituting machine-readable, tangible media.

The data structures and instructions 622 may further be transmitted or received over a network 624 via network interface device 616 utilizing any one of a number of well-known transfer protocols HyperText Transfer Protocol (HTTP)). Network 624 can generally include any type of wired or wireless communication channel capable of coupling together computing nodes (e.g., the computer system 600). This includes, but is not limited to, a local area network, a wide area network, or a combination of networks. In some embodiments, network 624 includes the Internet Certain embodiments are described herein as including logic or a number of components, modules, or mechanisms. Modules may constitute either software modules (e.g., code and/or instructions embodied on a machine-readable medium or in a transmission signal) or hardware modules. A hardware module is a tangible unit capable of performing certain operations and may be configured or arranged in a certain manner. In example embodiments, one or more computer systems (e.g., the computer system 600) or one or more hardware modules of a computer system (e.g., a processor 602 or a group of processors) may be configured by software an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor 602 or other programmable processor) that is temporarily configured by software to perform certain operations. It will be appreciated that the decision to implement a hardware module mechanically, in dedicated and permanently, configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor 602 configured using software, the general-purpose processor 602 may be configured as respective different hardware modules at different times. Software may accordingly configure a processor 602, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors 602 that are temporarily configured (e.g., by software, code, and/or instructions stored in a machine-readable medium) or permanently configured to perform the relevant operations. Whether temporarily or permanently configured, such processors 602 may constitute processor-implemented (or computer-implemented) modules that operate to perform one or more operations or functions. The modules referred to herein may, in some example embodiments, comprise processor-implemented (or computer-implemented) modules.

Moreover, the methods described herein may be at least partially processor-implemented (or computer-implemented) and/or processor-executable (or computer-executable). For example, at least some of the operations of a method may be performed by one or more processors 602 or processor-implemented (or computer-implemented) modules. Similarly, at least some of the operations of a method may be governed by instructions that are stored in a computer readable storage medium and executed by one or more processors 602 or processor-implemented (or computer-implemented) modules. The performance of certain of the operations may be distributed among the one or more processors 602, not only residing within a single machine, but deployed across a number of machines. In some example embodiments, the processors 1002 may be located in a single location (e.g., within a home environment, an office environment or as a server farm), while in other embodiments the processors 602 may be distributed across a number of locations.

While the embodiment(s) is (are) described with reference to various implementations and exploitations, it will be understood that these embodiments are illustrative and that the scope of the embodiment(s) is not limited to them. In general, the embodiments described herein may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and its practical applications, to thereby enable others skilled in the art to best utilize the embodiments and various embodiments with various modifications as are suited to the particular use contemplated.

What is claimed is:

1. A computer-implemented method for determining sentiment in Web documents, the method comprising:
    harvesting one or more Web documents from one or more content sources and extracting keywords from the Web documents;
    filtering, at a server, the keywords according to a phase transition method to produce filtered keywords;
    determining one or more categories for the Web documents according to the filtered keywords;
    determining sentiment expressed in the Web documents on a category-by-category basis; the sentiment determined by analysis of words identified as sentiment-bearing or opinion-bearing within the web documents; and
    reporting the sentiment so determined;
    wherein prior to extracting the keywords, harvested Web documents are filtered to remove Web documents which are not candidates for containing sentiment-bearing content, the filtering of the Web documents including, for each candidate Web document, extracting n-grams, determining an n-gram spectrum for the candidate Web document based on the extracted n-grams, wherein the n-gram spectrum indicates a frequency of occurrence of n-grams as a function of a size of n-grams, and determining whether the n-gram spectrum for the candidate document conforms to a reference n-gram spectrum within a predetermined threshold, wherein the reference n-gram spectrum is defined by a predetermined function; and
    wherein the predetermined function is $cx^{-a} \cdot e^{-bx}$, where x is the size of the n-gram, and a, b, and c are predetermined values that place a peak of the predetermined function between an n-gram of size 2 and an n-gram of size 3.

2. The computer-implemented method of claim 1, wherein the phase transition method comprises $f/N^x$, where f is a measure of frequency of a respective keyword in a respective one of the Web documents, N is a number of Web documents that include the respective keyword and x is greater than or equal to 1.

3. The computer-implemented method of claim 2, wherein the keywords are extracted from harvested Web documents, in part, using stop word removal.

4. The computer-implemented method of claim 1, wherein the keywords are those n-grams extracted during the filtering process.

5. The computer-implemented method of claim 4, wherein for each subject extracted keyword, a frequency, f, of the subject keyword in the harvested Web documents, and a number of the Web documents, N, that includes the subject keyword are calculated and the phase transition method calculates relevancy of the subject keyword, based on its frequency in the harvested Web documents and the number of Web documents that include the subject keyword.

6. The computer-implemented method of claim 5, wherein the phase transition method is $f/N^x$, where $x \geq 1$.

7. The computer-implemented method of claim 6, wherein the relevancy of the subject keyword is compared to a pre-established threshold and the subject keyword is retained when the relevancy of the subject keyword exceeds that threshold, otherwise, the subject keyword is not retained.

8. The computer-implemented method of claim 7, wherein retained keywords are classified into categories using a classification module, the module defining unique pairs of keywords that are related to each other.

9. The computer-implemented method of claim 1, wherein the sentiment is reported within a context of product summaries, the summaries reflecting aggregate sentiment of individuals regarding a subject thereof.

10. The computer-implemented method of claim 1, wherein the Web documents are harvested by one or more customized Web crawlers, each respective Web crawler adapted according to one or more target Web sites for the respective Web crawler.

11. The computer-implemented method of claim 10, wherein each respective Web crawler is customized to parse specific Web pages from its target Web sites to a specified depth of Web pages.

12. The computer-implemented method of claim 11, wherein each respective Web crawler is configured to begin crawling a respective target Web site from a specified seed node, extract hyperlinks from the seed node and visit Web pages referenced thereby, at which Web pages the respective Web crawler downloads content or not, according to one or more URL and content filters.

13. The computer-implemented method of claim 1, wherein determining sentiment comprises determining polarities of individual sentences, or portions thereof, in respective ones of the Web documents.

14. The computer-implemented method of claim 13, wherein determining sentiment further comprises splitting candidate ones of the Web Documents into units smaller than, equal to or larger than grammatical sentences, processing the units to identify categories to which the units refer or relate, identifying opinion-bearing words within the units, and classifying the orientation of opinion-bearing words as being associated with a positive sentiment, a neutral sentiment or a negative sentiment, according to a respective category within which context a respective opinion-bearing word appears in a respective unit.

15. The computer-implemented method of claim 14, wherein the opinion-bearing words comprise adjectives.

16. The computer-implemented method of claim 15, further comprising negating a determined sentiment of a respective unit if a negation word is determined to be within a defined distance of an opinion-bearing keyword used to classify the opinion-bearing keyword.

17. The computer-implemented method of claim 15, wherein after classifying the orientation of an opinion-bearing word, identifying a strength of opinion for the opinion-bearing word.

18. A computer-implemented method for determining sentiment in Web documents, comprising:
harvesting one or more Web documents from one or more content sources and extracting keywords from the Web documents;
filtering, at a server, the keywords according to a phase transition method to produce filtered keywords;
determining one or more categories for the Web documents according to the filtered keywords;
determining sentiment expressed in the Web documents on a category-by-category basis; the sentiment determined by analysis of words identified as sentiment-bearing or opinion-bearing within the web documents; and
reporting the sentiment so determined;
wherein prior to extracting the keywords, harvested Web documents are filtered to remove Web documents which are not candidates for containing sentiment-bearing content, the filtering of the Web documents including, for each candidate Web document, extracting n-grams, determining an n-gram spectrum for the candidate Web document based on the extracted n-grams, wherein the n-gram spectrum indicates a frequency of occurrence of n-grams as a function of a size of n-grams, and determining whether the n-gram spectrum for the candidate document conforms to a reference n-gram spectrum within a predetermined threshold, wherein the reference n-gram spectrum is defined by a predetermined function; and
wherein the predetermined function is $cx^{-a} \cdot e^{-bx}$, where x is the size of the n-gram, and a, b, and c are predetermined values that place a peak of the predetermined function between an n-gram of size 2 and an n-gram of size 3, and wherein b is between 1 and 2, and c is between 1 and 2.

19. A computer-implemented method for determining sentiment in Web documents, the method comprising:
harvesting one or more Web documents form one or more content sources and extracting keywords from the Web documents;
filtering, at a server, the keywords according to a phase transition method to produce filtered keywords;
determining one or more categories for the Web documents according to the filtered keywords;
determining sentiment expressed in the Web documents on a category-by-category basis; the sentiment determined by analysis of words identified as sentiment-bearing or opinion-bearing within the web documents; and
reporting the sentiment so determined;
wherein prior to extracting the keywords, harvested Web documents are filtered to remove Web documents which are not candidates for containing sentiment-bearing content, the filtering of the Web documents including, for each candidate Web document, extracting n-grams, determining an n-gram spectrum for the candidate Web document based on the extracted n-grams, wherein the n-gram spectrum indicates a frequency of occurrence of n-grams as a function of a size of n-grams, and determining whether the n-gram spectrum for the candidate document conforms to a reference n-gram spectrum within a predetermined threshold, wherein the reference n-gram spectrum is defined by a predetermined function; the candidate Web document being retained when the n-gram spectrum for the candidate Web document conforms to the reference n-gram spectrum within the predetermined threshold, and discarded when the n-gram spectrum for the candidate Web document does not conform to the reference n-gram spectrum within the predetermined threshold.

* * * * *